United States Patent
Muthiah et al.

(10) Patent No.: US 12,333,420 B2
(45) Date of Patent: Jun. 17, 2025

(54) ADAPTIVE MIXED DIGITAL AND ANALOG COMPUTATIONAL STORAGE SYSTEMS

(71) Applicant: Sandisk Technologies, Inc., Milpitas, CA (US)

(72) Inventors: Ramanathan Muthiah, Bangalore (IN); Ramkumar Ramamurthy, Bangalore (IN)

(73) Assignee: Sandisk Technologies, Inc., Milpitas, CA (US)

( * ) Notice: Subject to any disclaimer, the term of this patent is extended or adjusted under 35 U.S.C. 154(b) by 1143 days.

(21) Appl. No.: 17/173,843

(22) Filed: Feb. 11, 2021

(65) Prior Publication Data

US 2022/0138545 A1 May 5, 2022

Related U.S. Application Data (60) Provisional application No. 63/110,298, filed on Nov. 5, 2020.

(51) Int. Cl.
*G06N 3/063* (2023.01)
*G06F 9/50* (2006.01)
(Continued)

(52) U.S. Cl.
CPC .......... *G06N 3/065* (2023.01); *G06F 9/5044* (2013.01); *G06N 3/08* (2013.01)

(58) Field of Classification Search
None
See application file for complete search history.

(56) References Cited

U.S. PATENT DOCUMENTS

| 5,745,409 A | 4/1998 | Wong et al. |
| 8,719,438 B2 | 5/2014 | Fallon |

(Continued)

FOREIGN PATENT DOCUMENTS

WO 2019246064 A1 12/2019

OTHER PUBLICATIONS

Arindam Mallik; "Analog Computing for Machine Learning—An Ideal Case for Co-Optimization of System and Device Technology"; Imec, Belgium; 2020 Symposia on VLSI Technology and Circuits, Jun. 14, 2020.

(Continued)

*Primary Examiner* — Van H Nguyen
(74) *Attorney, Agent, or Firm* — PATTERSON + SHERIDAN, LLP (57) ABSTRACT

Various embodiments of this disclosure are directed to a mixed digital and analog domain approach to computational storage or memory applications. The mixed approach enables certain compute operations to be advantageously performed in the analog domain, achieving power saving. In some embodiments, an analog compute core is implemented based on a first set of memory elements that are made available with a second set of memory elements for digital data storage. A controller coupled to both sets of memory elements is able to selectively direct computational tasks to either the analog compute core or a digital processor coupled with the controller, based on one or more parameters including power, precision, and workload. In certain embodiments involving neural network tasks, the controller is configured to route certain tasks to the analog compute core based on neural network based factors such as network layer positioning and input signal type.

21 Claims, 5 Drawing Sheets

(51) Int. Cl.
  *G06N 3/065* (2023.01)
  *G06N 3/08* (2023.01)

(56) References Cited

U.S. PATENT DOCUMENTS

| | | | |
|---|---|---|---|
| 10,346,347 B2 | 7/2019 | Lu et al. | |
| 10,848,167 B1* | 11/2020 | Far | G06N 3/08 |
| 11,061,646 B2* | 7/2021 | Sumbul | G11C 8/08 |
| 11,790,241 B2* | 10/2023 | Reisser | G06N 3/047 706/15 |
| 11,900,185 B2* | 2/2024 | King | G06N 5/04 |
| 2002/0049576 A1* | 4/2002 | Meyer | G06F 30/367 703/4 |
| 2016/0328642 A1* | 11/2016 | Himebaugh | G06F 1/3209 |
| 2019/0042160 A1 | 2/2019 | Kumar et al. | |
| 2019/0042199 A1* | 2/2019 | Sumbul | G11C 7/12 |
| 2020/0242458 A1* | 7/2020 | Manipatruni | G06N 3/065 |
| 2021/0073650 A1* | 3/2021 | Reisser | G06N 3/065 |

OTHER PUBLICATIONS

Boris Murmann; Prospects of Analog In-Memory Computing—An Overview, 2020 Symposia on VLSI Technology and Circuits, Jun. 14, 2020.

Huang et al.; "A Heterogeneous PIM Hardware-Software Co-Design for Energy-Efficient Graph Processing"; 2020 IEEE International Parallel and Distributed Processing Symposium (IPDPS); available at https://ieeexplore.ieee.org/document/9139839.

Jae-Sun Seo; "Monolithically Integrated RRAM-based Analog/Mixed-Signal In-Memory Computing for Energy-Efficient Deep Learning"; Arizona State University; Workshop on "Analog Computing Technologies and Circuits for Efficient Machine Learning Hardware"; 2020 Symposia on VLSI Technology and Circuits, Jun. 14, 2020.

Jaydeep P. Kulkarni; Compute-in-Memory Circuit and Device Technologies: Trends and Prospects; University of Texas at Austin; 2020 Symposia on VLSI Technology and Circuits, Jun. 14, 2020.

Le Gallo et al.; "Mixed-Precision In-Memory Computing"; Oct. 4, 2018; Nature Electronics pp. 246-253; available at https://www.nature.com/articles/s41928-018-0054-8.

Mahesh Mehendale; "System and Architecture Level Considerations in Leveraging Mixed-Signal Techniques for ML at the Edge"; Texas Instruments Inc.; 2020 Symposia on VLSI Technology and Circuits, Jun. 14, 2020.

Robert L. Bruce; "Designing Materials Systems and Algorithms for Analog Computing"; IBM Research; 2020 Symposia on VLSI Technology and Circuits, Jun. 14, 2020.

* cited by examiner

ADAPTIVE MIXED DIGITAL AND ANALOG COMPUTATIONAL STORAGE SYSTEMS

CROSS-REFERENCE TO RELATED APPLICATION

This application claims the benefit of U.S. Provisional Application No. 63/110,298 entitled "ADAPTIVE MIXED DIGITAL AND ANALOG COMPUTATIONAL STORAGE SYSTEMS", filed on Nov. 5, 2020, which is hereby incorporated by reference in its entirety.

BACKGROUND

Data storage devices and systems can be used, for example, in data centers or as edge devices for Machine Learning (ML) applications. One of the key ML metrics concerns the potentially large power consumption of ML in both training and inference phases. In particular, for edge ML applications where the power source is often battery-supplied, having a power efficient ML execution is often preferred. However, there is often a concern with the negative tradeoffs associated with limited power such as reduced accuracy.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown in detail to avoid unnecessarily obscuring the various embodiments.

Computational Storage and Analog Compute

Computation in storage systems (or computational storage) is a well-known concept. The gravity of the data has pulled computations closer to the data; such systems are optimal as they greatly reduce data transfer time. Common computational storage approaches involve putting compute elements near storage/memory elements where data is stored. The compute elements are typically digital processor cores or other digital circuitry.

Various embodiments of this disclosure are directed to a mixed digital and analog domain approach to computational storage or memory applications. The mixed approach enables certain compute operations to be advantageously performed in the analog domain, achieving power saving. In some embodiments, an analog compute core is implemented based on a first set of memory elements made available with a second set of memory elements for digital data storage. A controller coupled to both sets of memory elements is able to selectively direct computational tasks to either the analog compute core or a digital processor coupled with the controller, based on one or more parameters including power, precision, and workload. In certain embodiments involving neural network tasks, the controller is configured to route certain tasks to the analog compute core based on neural network based factors such as network layer positioning and input signal type.

One embodiment is a memory device, comprising: (1) a digital processor configured to perform computations in a digital domain; (2) an analog in-memory compute unit configured to perform computations in an analog domain, the analog in-memory compute unit comprising an array of memory elements configured to store weights for a neural network; (3) a non-volatile memory array; and (4) control circuitry. The control circuitry is configured to: retrieve data from the non-volatile memory array; and for each stage of a plurality of stages of a computation related to the neural network: (1) determine whether the digital processor or the analog in-memory compute unit is to execute the stage of computation, based at least on parameters including at least one of power and precision parameters; and (2) direct the retrieved data from the non-volatile memory array for stage of computation to either the digital processor or the analog in-memory compute unit based on the determination.

Another embodiment is a method of performing inference in a neural network within a data storage device. The method comprises: retrieving, from a non-volatile memory array in a data storage device comprising a digital processing circuitry and an analog in-memory compute unit, data associated with a plurality of computational tasks associated with an inference operation of a neural network; and for each computational task: (1) determining whether the digital processing circuitry or the analog in-memory compute unit is to execute the task, based at least on parameters including a network layer position of the computational task within the neural network; and (2) based on the determining, directing the computational task and the associated retrieved data to the digital processing circuitry or the analog in-memory compute unit.

Another embodiment is a memory device comprising: (1) a digital processor; (2) a first memory array configured to serve as an analog in-memory compute unit; (3) a second memory array configured to digitally store data; and (4) control circuitry. The control circuitry is configured to: for each stage of a plurality of stages of a neural network computation: (1) retrieve data from the second memory array; (2) based on the retrieved data, determine whether a current stage can be performed in both digital and analog domains; (3) in response to the current stage determined to be capable of being performed in both digital and analog domains, determine whether the analog in-memory compute unit is available to execute the current stage based on its workload; and (4) direct the current stage of the neural network computation and the retrieved data to the analog in-memory compute unit in response to determining that the analog in-memory compute unit is available.

Figure 1:
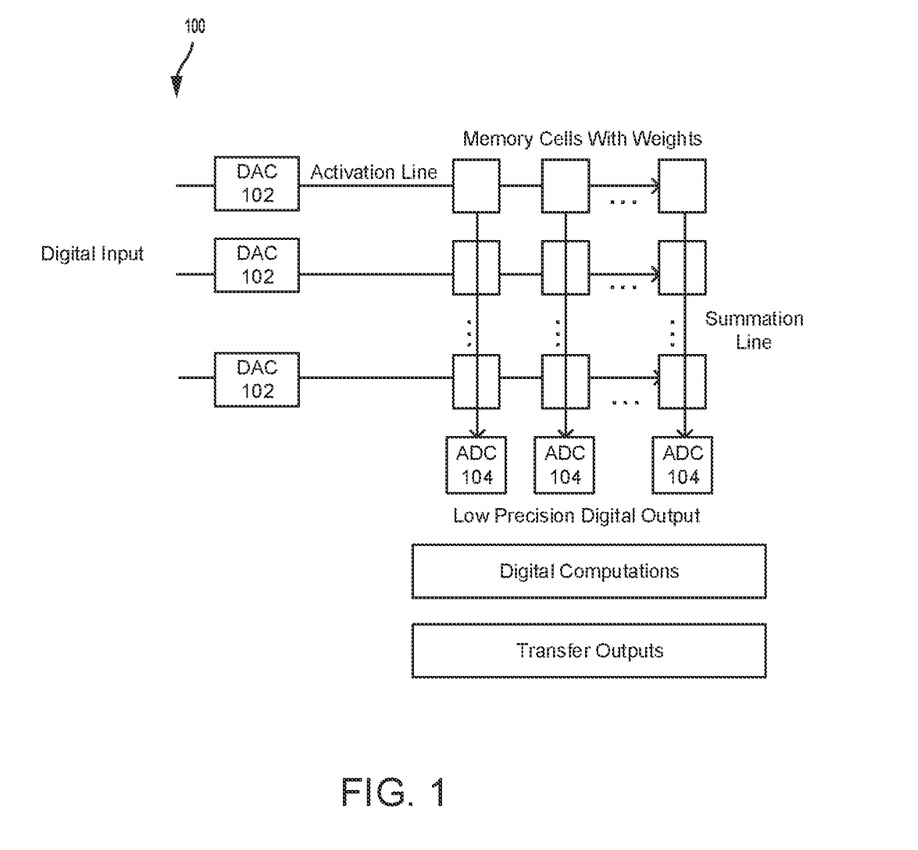
FIG. 1 illustrates an example analog based compute-in-memory structure.

FIG. 1 illustrates an example analog based compute-in-memory structure. This example is based on a cross-bar memory array, where the individual memory cells within the grid are configured to store weights for the neural network. The grid is formed by wordlines in the horizontal direction and bitlines in the vertical direction. To perform a multiple-and-accumulate (MAC) operations common in neural network operations, input values are converted by DAC 102 into analog values, which are sent via the activation lines into the memory cells. The input values (e.g., in the form of voltage) are multiplied by the stored weights in the memory cells (e.g., in the form of resistances) and results (e.g., in the form of current) are accumulated along the bitline (vertical) direction and fed into the output ADC 104, which converts the output into digital values for further processing. The weight is represented in each memory cell which may have different levels of resistance. The memory cells may be based on various underlying physical elements capable of storing the weights as resistances, inductances, or other values capable of being electrically determined and programmed. Example memory types include NAND or NOR flash memory, Resistive Random Access Memory (ReRAM), Phase Change Memory (PCM), Magneto-resistive Random Access Memory (MRAM) and other suitable memory types adapted to store weights as analog values.

System Examples

Figure 2:
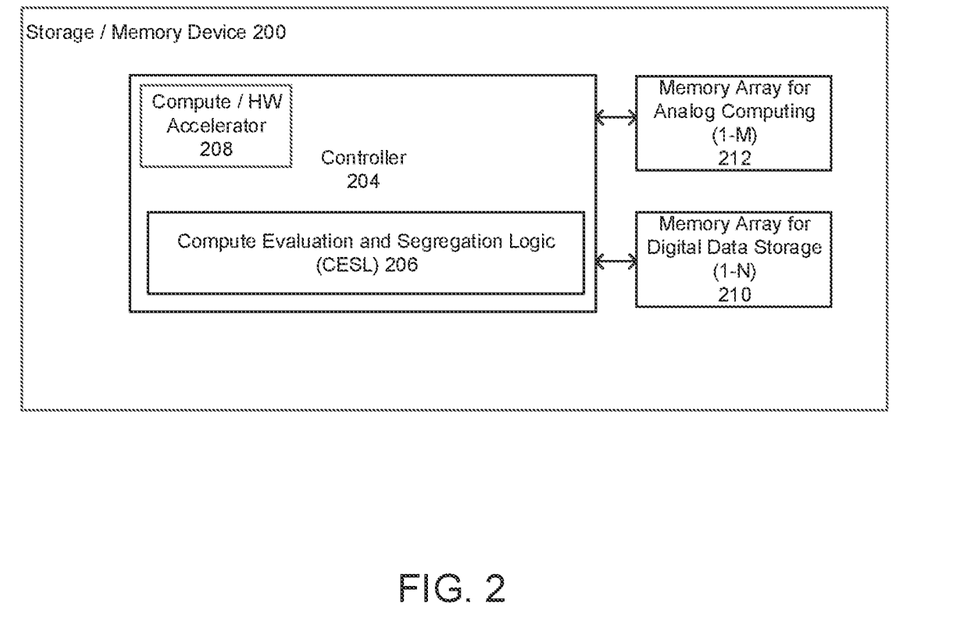
FIG. 2 illustrates an example storage or memory device with integrated mixed digital and analog compute capability according to one or more embodiments.

FIG. 2 illustrates an example storage or memory device with integrated mixed digital and analog compute capability according to one or more embodiments. A storage or memory device 200 includes a controller 204 which controls a memory array 212 for analog computing (also referred to as "analog core 212" below) and a memory array 210 for digital data storage. In one embodiment, the memory array 212 for analog computing may be implemented similar to what is shown in the example in FIG. 1. In one embodiment, the memory array 212 for analog computing and the memory array 210 may be formed of the same or similar underlying physical memory elements fabricated under a same or similar semiconductor process. For example, they may each comprise a same or similar type of flash memory, ReRAM or MRAM, with array 212 operating in an analog compute configuration (along with the supporting circuitries such as those shown in the FIG. 1) while array 210 operating in a digital data storage configuration with its own supporting circuitries for data storage applications. In one embodiment, the two arrays may be fabricated together into a single memory package. In other embodiments, different memory types may be used for the two arrays. The array 210 can also be volatile memory in some embodiments. In another embodiment, the logic circuits (e.g., controller 204 including compute evaluation and segregation logic 206 and/or compute/hardware accelerator 208) may be fabricated near, above, or beneath the memory elements of the two arrays and also integrated into the same single package. While two arrays are shown and described for simplicity of description, the disclosure is intended to cover implementations with different numbers and combinations of memory arrays that include the two main types described above.

In one embodiment, the controller 204 includes a compute evaluation and segregation logic (CESL) 206, and may also include a compute/hardware accelerator 208 (also referred to as "digital processor" below). While FIG. 2 shows a compute/hardware accelerator as part of the controller for reference, the compute/hardware accelerator 208 can be separate from and external to the controller 204. The digital processor 208 can be custom logic circuitry implemented in Application Specific Integrated Circuit (ASIC), microcontrollers, one or more Digital Signal Processors (DSPs), FPGAs, hard-wired logic, one or more CPU cores, one or more GPU cores, and combinations thereof. Similarly the controller 204 can be custom logic circuitry implemented in Application Specific Integrated Circuit (ASIC), microcontrollers, one or more Digital Signal Processors (DSPs), FPGAs, hard-wired logic, one or more CPU cores, one or more GPU cores, and combinations thereof.

As mentioned above, in one embodiment, the memory device 200 is a memory device for which components are tightly integrated, with logic circuits (e.g., the controller 204) placed near, above, or below the fabricated memory elements (the analog core 212 and the memory array 210). This approach may provide an "on-die" or "near-die" compute implementation. In one example embodiment, the on-die compute may include memory chips or arrays that have additional elements such as a processor, processor coupled memory such as SRAM, cache, and error correction/protection within die circuitry, etc., coupled with the analog core in a single system/device. In another embodiment, the storage or memory device 200 is constituted more like a conventional solid state storage device, with discrete memory and logic components coupled together on a printed circuit board. In yet another embodiment, the analog core 212 and the memory array 210 may be packaged together with the other logic circuitry packaged separately.

In one embodiment, the storage or memory device 200 is tasked with performing computational tasks, for example, by a host, and the CESL 206 segregates computational tasks as analog and digital compute according to various factors and conditions. These factors and conditions include: available storage resources, storage workload, precision requirements of applications, and compute power available. The CESL 206 is, in one embodiment, also tasked with data storage management functions for the memory array 210. For example, it may manage data placement, address translation tasks, etc. In one embodiment, it may perform functions akin to those management tasks commonly performed by a NAND flash memory controller's flash translation layer (FTL). In various embodiments, the CESL 206 may be a discrete hardware/logic component within the controller 208, or implemented as a firmware/software module executed within by a processor or other circuitry within the controller 208.

Generally speaking, the CESL 206 is able to leverage different resources such as the analog core 212 and the compute/hardware accelerator 208 for power efficient computation. While analog computing is generally more power efficient than digital computing, it usually is better suited for lower precision computing. In one embodiment, certain convolution tasks could be routed to the analog core 212 to take advantage of the power efficiency of analog computing, with other non-convolution tasks and tasks requiring precision performed by digital logic/resource coupled to, or embedded within, the controller (e.g., the compute/hardware accelerator 208).

Figure 3:
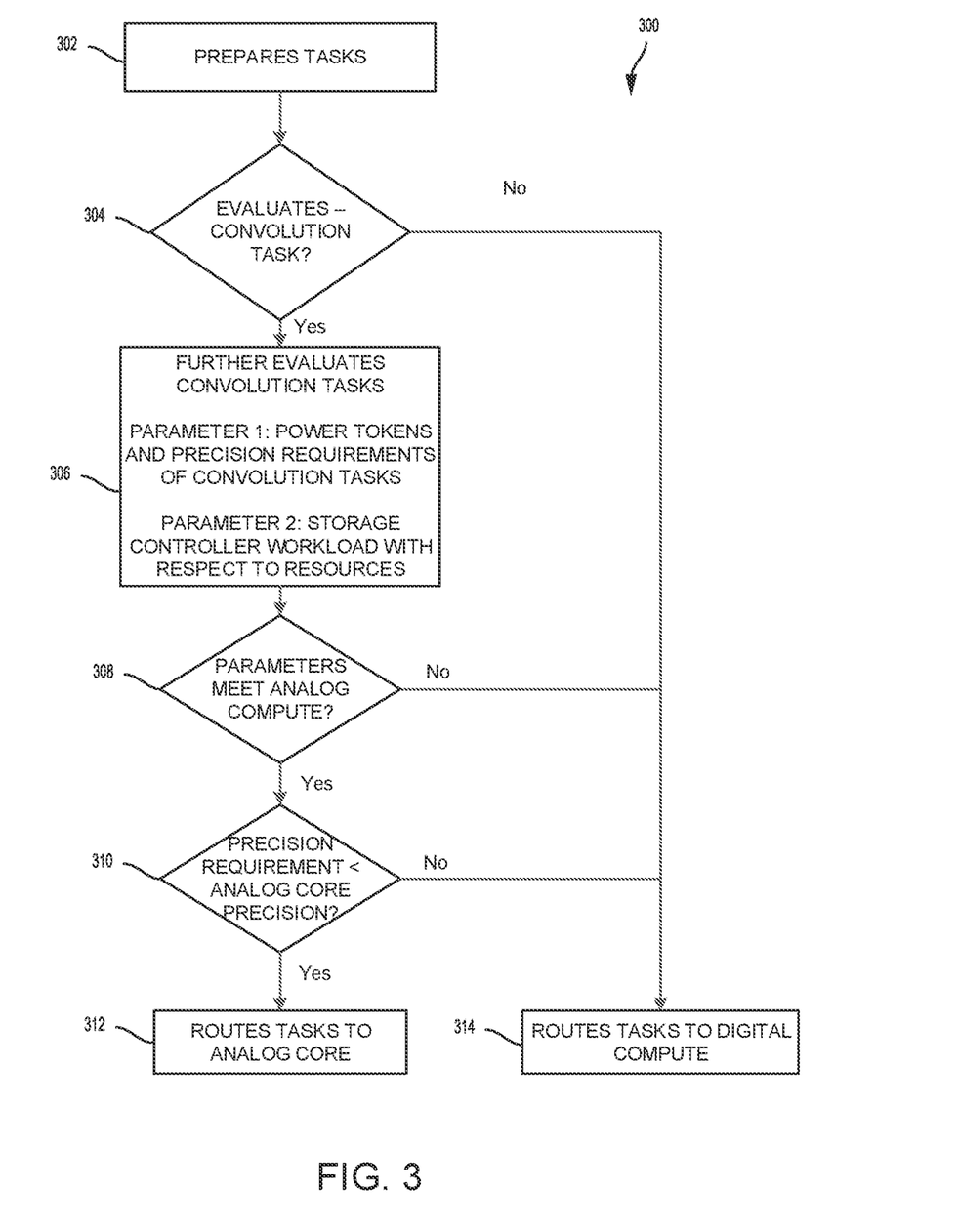
FIG. 3 illustrates a flow of task evaluation and routing according to one or more embodiments.

FIG. 3 illustrates a flow of task evaluation and routing according to one embodiment. In one embodiment, the CSEL determines whether the digital or analog compute resource is best suited to execute a current stage of computation based on parameters including at least one of power and precision.

In one embodiment, when both the analog and digital resources are free and the precision requirements from the end application involve analog and digital convolution tasks (e.g., steps within a Convolution Neural Network (CNN) inference), the CESL 206 chooses the low power option of applying analog to the convolution tasks that are analog eligible. In one embodiment, power and precision are two relevant parameters for the device to determine the optimal selection for convolution tasks within CNN, and tasks for other similar neural network constructs.

The process 300 begins with the CESL 206 preparing tasks at block 302. Task preparation may involve retrieving data such as from the memory array 210. It may also involve pre-processing task-related data which may include downscaling, upscaling, combining, converting data, etc.

In one implementation, the CESL 206 may be preconfigured so that only convolutions are routed to the analog domain and the rest of the computation tasks are routed to the digital domain. In such a case, the process 300 continues with the CESL 206 evaluating at block 304 whether the present task involves a convolution task potentially suitable for analog compute. If so, it continues to block 306. If the task is not a convolution task, then it is routed to digital compute at block 314.

In another embodiment, there is no pre-configuration to divert between the convolution versus non-convolution tasks. Thus, this block 304 is omitted and tasks in that case are evaluated in blocks 306 and 308 without the potential diversion of block 304.

Returning to block 306, additional evaluation may be further undertaken by the CESL 206. This may involve the aforementioned power, precision and workload considerations. In this example shown, the first parameter involves power tokens and precision requirements and the second parameter involves storage controller workload with respect to resources. The CESL 206 may have a token policy for power for different computes at hand, as well as the currently available power in the device. As shown in block 308, these parameters are then evaluated to see if they meet the criteria for analog compute at block 308. Stated another way, the CESL 206 uses these parameters and evaluates the value for compute in a destination based on power and/or precision, and accordingly invokes compute to the analog core 212 or to the digital processor 208. While block 306 mentions convolution tasks as an example, as discussed above, where there is no pre-configuration to divert in block 304, all tasks are evaluated according to the parameters in block 306 (i.e., those parameters apply to tasks generally) for either analog or digital compute.

If the current task is not deemed to meet the analog compute criteria, the task is routed to digital compute in block 314. Otherwise, the task remains for further evaluation at an optional block 310, where the precision requirement is evaluated. In one example, the CESL 206 determines which signals or applications associated with the task may not be sensitive to low precision. Tasks that are not sensitive to low precision are then routed to the analog core at block 312. In some embodiments, the precision evaluation is omitted. In other embodiments, the precision evaluation is incorporated as the primary parameter in blocks 306 and 308, in place of, or in addition to, those other parameters discussed above.

Once a task is routed to a digital or analog domain, then the next task can be evaluated per the process 300 which begins anew. In some embodiments, as part of routing to the analog or digital domain, the CESL may downscale data associated with a current task to be performed in the analog core 212, or upscale data associated with a current task to be performed in the compute/hardware accelerator 208.

Segregation by Neural Network Layer

Figure 4:
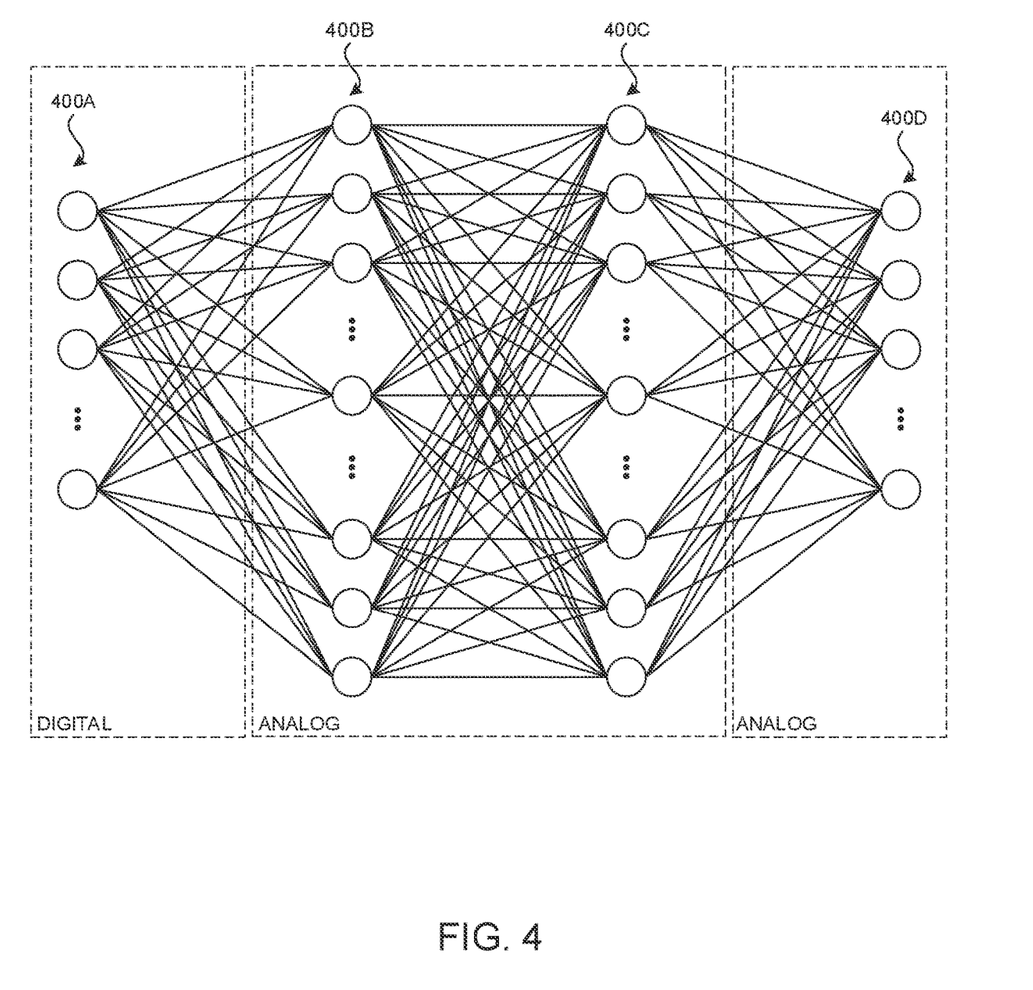
FIG. 4 shows an example neural network illustrating diversion of compute tasks associated with various layers according to one or more embodiments.

The concept of precision sensitivity determination is further explored in this and the next section. In an example with deep neural networks (DNN) involving multiple layers, there is often a requirement to perform multiple levels of processing (e.g., convolution) at every layer to determine the output layer. FIG. 4 shows an example neural network illustrating diversion of tasks associated with various layers. The CESL 206 may (1) route some of the computation tasks needing more precision (e.g., initial layers needing higher signal-to-noise ratio (SNR)) to digital compute, and (2) route the rest of the computation tasks (e.g., latter layers not needing higher SNR) to the analog core 212, to leverage the power efficiency of analog computing. In the example in FIG. 4, initial layer 400A would be routed to digital compute while the inner layers 400B and 400C would be routed to analog compute. The end layer 400D is shown as routed to analog compute, but can be routed to digital compute in certain implementations or situations that require a higher precision in the end layer. In other embodiments, the layers are more generally routed to digital compute based on pre-determined SNR requirements of the particular layers and may not be necessarily confined to the initial versus latter layer division shown in the example.

Segregation by Signal Type

Figure 5:
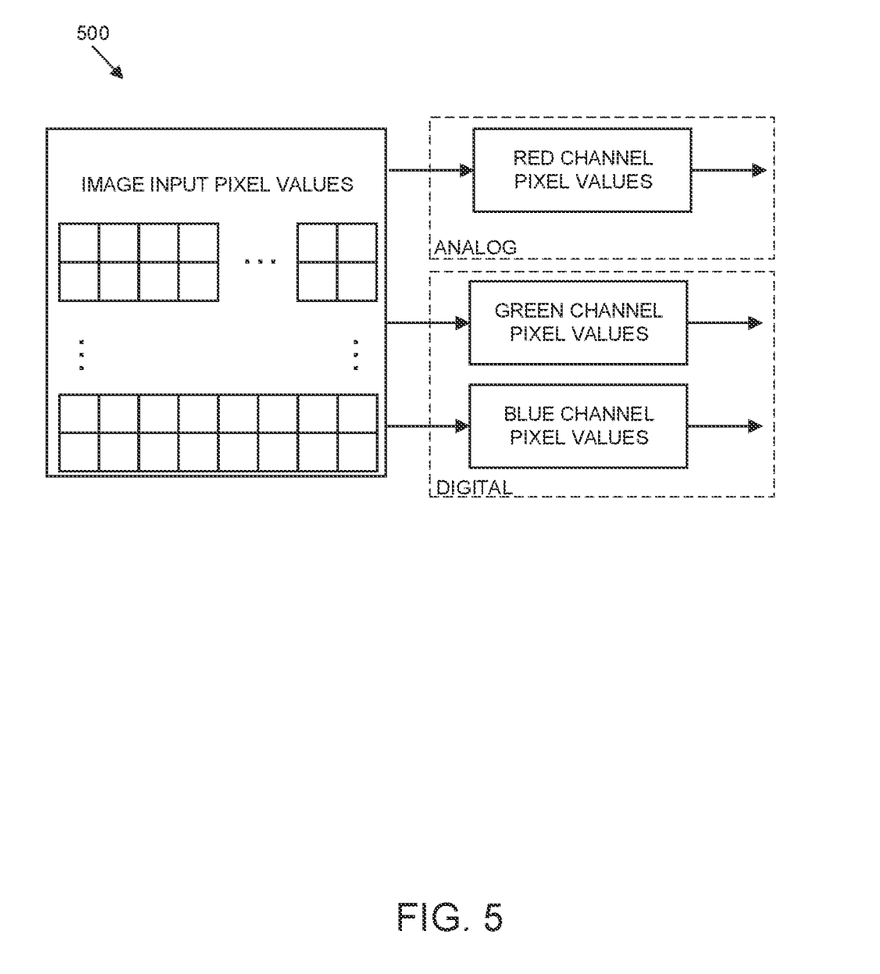
FIG. 5 shows an example where input image data may be separated into multiple channels and selectively diverted to digital or analog compute according to one or more embodiments.

Precision sensitivity determination may also fall along signal types. FIG. 5 shows an example where image pixel data of an input image for processing may be split into multiple channels, a channel for per color (e.g., red, green and blue), according to one embodiment. The color channel (s) requiring higher precision may be routed for digital processing, with the other color channel(s) routed to the analog core. Image data may be also segregated by image layers or sub-image areas (e.g., background vs. foreground; objects of interest vs. non-objects of interest) instead of, or in addition to, color channels, for the low precision sensitivity analysis. Similarly, video data may be decomposed into smaller components such as frames, layers, etc., and audio data may also be decomposed into different channels. These decomposed components or channels may then be individually evaluated to determine whether they are to be routed to the analog core or the digital processor, based on sensitivity to low precision processing.

In an example, the digital converted resultant data of analog output may undergo further processing in the digital domain. The CESL 206 can process the digital data further in the digital domain, which may include data conversion, down sampling, digital filtering and so on.

In a use case, the storage/memory device may include input interfaces where analog or digital sensor data may be received separately. The sensor data may be an output of a sensor of an autonomous vehicle, processed as analog or digital data, and with resultant data provided as analog or digital data back to an external host system, e.g., a control system for the autonomous vehicle. Analog data from the analog sensors may be first directed to the analog core and later processed in the digital domain. Thus, the storage/memory device 200 can serve as a feedback mechanism to the analog sensors without host intervention.

Storage Optimization and Processing Staging

In various embodiments, the analog and digital computing resources can work in parallel. For example, the compute may be serialized, where intermediate results of one computing core/aspect may be passed to other cores/aspects. The CESL can manage and organize the computational stages and route by the power efficiency and/or precision sensitivity metrics as discussed above.

In one embodiment, the CESL 206 can store intermediate results obtained from analog convolution (after digital conversion) in the memory array 210. In particular, the analog core may provide results to the controller 204 (via ADC 104), and the results can then be error correction encoded for parity, and sent to the memory array 210. The intermediate results stored in the memory array 210 can subsequently be used for analog or digital processing in a next task or next stage. In some cases, data may be sent out of the device 200 to an external device depending on the requirements. The storage of intermediate analog-based compute data may be logically separated from rest of the digital data as needed (e.g., into separate erase blocks in a NAND flash memory array). For example, segregation of such data could be beneficial for garbage collection optimization, as the rate of data re-writes for such intermediate results for analog compute may be faster than other data. Generally, the CESL 206 may be tasked with managing the data storage in the memory array 210, and the segregation of intermediate results (analog from digital) can provide differentiated and optimized storage management policy for each type of data stored. The policy may apply to tasks including garbage collection, wear leveling, error correction, etc. For example, a lower-powered error correction scheme may be used for intermediate results related to tasks for the analog core.

OTHER EMBODIMENTS

Those of ordinary skill in the art will appreciate that the various illustrative logical blocks, modules, and processes described in connection with the examples disclosed herein may be implemented as electronic hardware, software, or combinations of both. Furthermore, the foregoing processes can be embodied on a computer readable medium which causes a processor, controller, or other circuitry to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, modules, and circuitry described in connection with the examples disclosed herein may be implemented or performed with a general purpose processor, a GPU, a DSP, an ASIC, an FPGA or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. Processor or controller circuitry may also be implemented as a combination of computing devices, e.g., a combination of a DSP and a microprocessor, a plurality of microprocessors, an SoC, one or more microprocessors in conjunction with a DSP core, or any other such configuration.

The activities of a method or process described in connection with the examples disclosed herein may be embodied directly in hardware, in a software module executed by processor or controller circuitry, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable media, an optical media, or any other form of storage medium known in the art. An exemplary storage medium is coupled to processor or controller circuitry such that the processor or controller circuitry can read information from, and write information to, the storage medium. In the alternative, the storage medium may be integral to processor or controller circuitry. The processor or controller circuitry and the storage medium may reside in an ASIC or an SoC.

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the spirit or scope of the present disclosure. The described embodiments are to be considered in all respects only as illustrative and not restrictive. In addition, the use of language in the form of "at least one of A and B" in the following claims should be understood to mean "only A, only B, or both A and B".

What is claimed is:

1. A memory device, comprising:
a digital processor configured to perform computations in a digital domain;
an analog in-memory compute unit configured to perform computations in an analog domain, the analog in-memory compute unit comprising an array of memory elements configured to store weights for a neural network, wherein input data for the neural network comprises image data or audio data, the image data comprising a plurality of color channels and the audio data comprising a plurality of audio channels; and
control circuitry configured to:
receive input data; and
for each color channel of the plurality of channels or for each audio channel of the plurality of audio channels:
determine precision sensitivity of the received input data, wherein precision sensitivity is measured by a signal-to-noise ratio (SNR) value;
determine whether the digital processor or the analog in-memory compute unit is to execute inference operations for the color channel or the audio channel based on power efficiency of the digital processor and the analog in-memory compute unit and precision sensitivity of the received input data; and
direct the received input data for the color channel or for the audio channel to either the digital processor or the analog in-memory compute unit based on the determination, wherein the directing comprises:
routing the received input data having a SNR value greater than a threshold to the digital processor; and routing the received input data having a SNR value less than the threshold to the analog in-memory compute unit.

2. The memory device of claim 1, wherein for a plurality of stages of a computation related to the neural network, the control circuitry is further configured to determine based on parameters to:
direct a pre-configured number of initial stages of the computation to the digital processor; and
direct stages after the pre-configured number of initial stages of the computation to the analog in-memory compute unit.

3. The memory device of claim 1, further comprising a non-volatile memory array; and
wherein for a plurality of stages of a computation related to the neural network, the control circuitry is further configured to:
retrieve data from the non-volatile memory array;
for each stage of a plurality of stages of a computation related to the neural network:
determine, based at least on a power parameter, whether the digital processor or the analog in-memory compute unit is to execute the stage of computation; and
direct the retrieved data from the non-volatile memory array for the stage of computation to either the digital processor or the analog in-memory compute unit based on the determination.

4. The memory device of claim 1, further comprising a non-volatile memory array; and
wherein the control circuitry is further configured to store, in the non-volatile memory array, intermediate results of the inference operations for a color channel or audio channel directed to the analog in-memory compute unit as segregated from intermediate results of the inference operations for a color channel or audio channel directed to the digital processor.

5. The memory device of claim 4, wherein the control circuitry is further configured to:
perform address translation functions for data stored in the non-volatile memory array; and
apply a different storage management policy to the intermediate results of the inference operations directed to the analog in-memory compute unit than a storage management policy for the intermediate results of the inference operations directed to the digital processor.

6. The memory device of claim 5, wherein the storage management policy includes a policy relating to one or more of: garbage collection, wear leveling, and error correction.

7. The memory device of claim 1, further comprising an analog interface for receiving analog data from a sensor, wherein the received analog data from the sensor is routed to the analog in-memory compute unit.

8. The memory device of claim 1, wherein the analog in-memory compute unit is fabricated with the non-volatile memory array in a single package.

9. The memory device of claim 8, wherein the digital processor and the control circuitry are fabricated within the single package.

10. A method of performing inference in a neural network within a data storage device, the method comprising:
retrieving, from a non-volatile memory array in a data storage device comprising a digital processing circuitry and an analog in-memory compute unit, data associated with a plurality of computational tasks associated with an inference operation of a neural network; and
for each computational task:
determining precision sensitivity of the retrieved data, wherein precision sensitivity is measured by a signal-to-noise ratio (SNR) value;
determining whether the digital processing circuitry or the analog in-memory compute unit is to execute the computational task, based at least on at least one parameter, wherein the at least one parameter is precision sensitivity of the retrieved data, wherein precision sensitivity corresponds to a network layer position of the computational task within the neural network, and wherein precision sensitivity is measured by a signal-to-noise ratio (SNR) value; and
based on the determining, directing the computational task and the associated retrieved data to the digital processing circuitry or the analog in-memory compute unit; and storing, in the non-volatile memory array, intermediate results of the plurality of computational tasks directed to the analog in-memory compute unit as segregated from intermediate results of the plurality of computational tasks directed to the digital processing circuitry, wherein the directing comprises:
routing the computational task and the associated retrieved data having a SNR value greater than a threshold to the digital processing circuitry; and
routing the computational task and the associated retrieved data having a SNR value less than the threshold to the analog in-memory compute unit.

11. The method of claim 10, wherein the at least one parameter route a computational task associated with one or more initial layers of the neural network to the digital processing circuitry.

12. The method of claim 10, wherein the at least one parameter route a computational task associated with one or more layers of the neural network requiring a pre-determined level of signal to noise ratio (SNR) to the digital processing circuitry.

13. The method of claim 10, further comprising:
applying different storage policies to the intermediate results of computational tasks directed to the analog in-memory compute unit and the intermediate results of computational tasks directed to the digital processing circuitry.

14. The method of claim 10, wherein the determining is further based on a parameter relating to a precision sensitivity of a sub-component of input data for the inference operation.

15. A memory device, comprising:
a digital processor;
a first memory array configured to serve as an analog in-memory compute unit;
a second memory array configured to digitally store data; and
control circuitry configured to:
for each stage of a plurality of stages of a neural network computation:
retrieve data from the second memory array;
based on the retrieved data, determine whether a current stage can be performed in both digital and analog domains;
in response to the current stage determined to be capable of being performed in both digital and analog domains, determine whether the digital processor or the analog in-memory compute unit is to execute the current stage based on:
available storage resources of the digital processor and the analog in-memory compute unit;

storage workload of the digital processor and the analog in-memory compute unit;
compute power available of the digital processor and the analog in-memory compute unit; and
precision sensitivity of the retrieved data, wherein precision sensitivity is measured by a signal-to-noise ratio (SNR) value;
direct the current stage of the neural network computation and the retrieved data to the analog in-memory compute unit or the digital processor based on the determining that the digital processor or the analog in-memory compute unit is to execute the current stage, wherein the directing comprises:
routing the retrieved data having a SNR value greater than a threshold to the digital processor; and
routing the retrieved data having a SNR value less than the threshold to the analog in-memory compute unit.

16. The memory device of claim 15, wherein the first and second memory arrays comprise the same type of memory elements and are fabricated in a single package, and wherein the digital processor and the control circuitry are fabricated within the same single package.

17. The memory device of claim 15, wherein stages of a neural network computation relate to training the neural network.

18. The memory device of claim 15, wherein stages of the neural network computation relate to an inference operation using a neural network.

19. The memory device of claim 15, wherein the control circuitry is further configured to downscale data associated with a current stage of the neural network computation to be performed in the analog in-memory compute unit, prior to sending the current stage to the analog in-memory compute unit.

20. The memory device of claim 15, wherein the control circuitry is further configured to upscale data associated with a current stage of the neural network computation to be performed in the digital processor, prior to sending the current stage to the digital processor.

21. A memory device, comprising:
a digital processor configured to perform computations in a digital domain;
an analog in-memory compute unit configured to perform computations in an analog domain, the analog in-memory compute unit comprising an array of memory elements configured to store weights for a neural network;
an analog input interface;
a digital input interface; and
control circuitry configured to:
receive analog sensor data from the analog input interface;
receive digital sensor data from the digital input interface;
determine precision sensitivity of the received analog sensor data and the received digital sensor data, wherein precision sensitivity is measured by a signal-to-noise ratio (SNR) value;
if the SNR value of the received analog sensor data is less than a threshold, direct the received analog sensor data to the analog in-memory compute unit to perform at least one computation related to the neural network; and
if the SNR value of the received digital sensor data is greater than the threshold, direct the received digital sensor data to the digital processor to perform at least one other computation related to the neural network.

* * * * *